United States Patent [19]

Jacobs et al.

[11] Patent Number: 4,704,675

[45] Date of Patent: Nov. 3, 1987

[54] METHOD FOR VELOCITY ADJUSTMENT OF INK JET NOZZLES IN A NOZZLE ARRAY

[75] Inventors: Norman A. Jacobs, Arlington Heights; Robert M. Wentzel, Mundelein, both of Ill.

[73] Assignee: AT&T Teletype Corporation, Skokie, Ill.

[21] Appl. No.: 944,086

[22] Filed: Dec. 22, 1986

[51] Int. Cl.[4] ........................ G01D 9/00; G01D 15/16

[52] U.S. Cl. ................................ 346/1.1; 346/140 R

[58] Field of Search ......................... 346/1.1, 140 PD; 310/311, 357, 317, 326, 358; 361/225; 29/25.35

[56] References Cited

U.S. PATENT DOCUMENTS

| | | | |
|---|---|---|---|
| 4,516,140 | 5/1985 | Durkee et al. | 346/140 PD |
| 4,538,156 | 8/1985 | Durkee et al. | 346/21 |
| 4,577,201 | 3/1986 | Murakami et al. | 346/140 PD |
| 4,612,553 | 9/1986 | Kohler | 346/1.1 |

OTHER PUBLICATIONS

Dr. R. K. Menon, TSI, Inc.; "Laser Doppler Velocimetry and Fiber Optics"; *Sensors;* pp. 32-36; Dec. 1985.

*Primary Examiner*—E. A. Goldberg
*Assistant Examiner*—Huan H. Tran
*Attorney, Agent, or Firm*—A. A. Tirva

[57] ABSTRACT

In an ink jet printer utilizing piezo ceramic actuators to generate ink droplets, the velocity of the ink droplets is controlled by adjusting the piezoelectric effect of the actuators.

9 Claims, 6 Drawing Figures

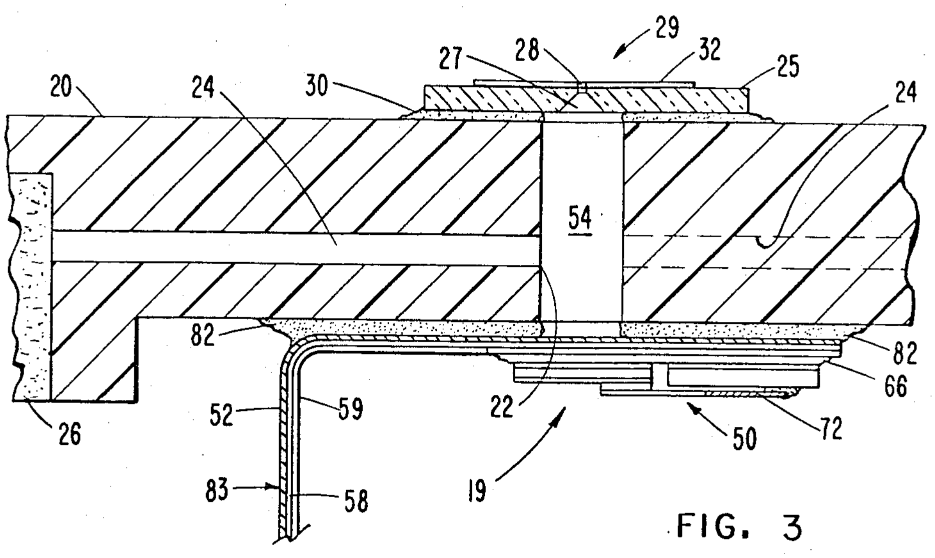
FIG. 3
FIG. 4
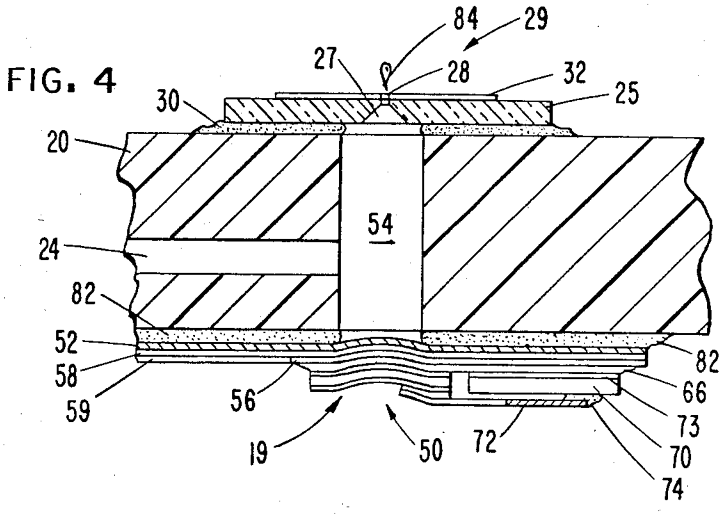
FIG. 5
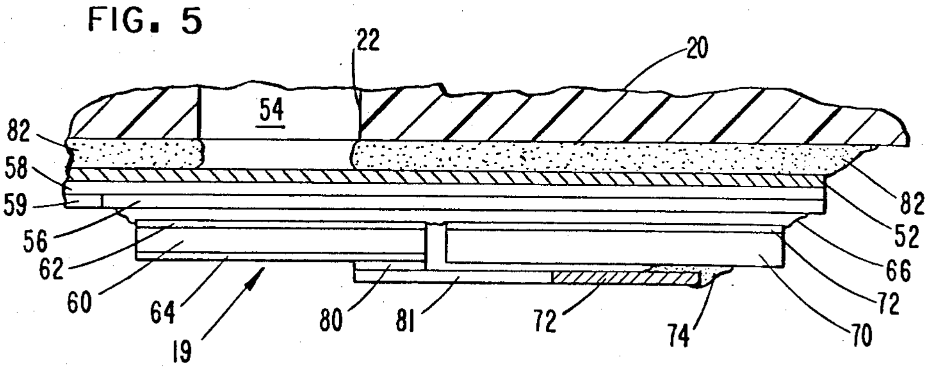

METHOD FOR VELOCITY ADJUSTMENT OF INK JET NOZZLES IN A NOZZLE ARRAY

DESCRIPTION

1. TECHNICAL FIELD

This invention relates to an ink jet dot printer comprising a head mounted on a carriage movable with respect to a support for a record medium and having a plurality of nozzles for ejecting the ink, each nozzle having a piezoelectric transducer for expelling a drop of ink through a corresponding nozzle in response to a predetermined electrical signal.

2. BACKGROUND ART

Ink jet printers utilizing movable print heads which include an array of ink jet nozzles and wherein each nozzle has its own piezoelectric transducer are well known in the art. Such ink jet printer is described in U.S. Pat. No. 4,538,156 entitled "Ink Jet Printer" by David B. Durkee et al issued Aug. 27, 1985.

One of the prime considerations in the fabrication of an array of ink jet nozzles is whether or not there is velocity uniformity with respect to the velocity of the droplets emitted from respective nozzles. If there is lack of velocity uniformity, there is an attendant misregistration of droplets on the record medium resulting in poor print quality.

One of the major factors contributing the lack of uniformity in the velocities of droplets is caused by the variation of the piezoelectric effect between transducers associated with individual nozzles in an array. This variation is present due to the properties of the material from which the transducers are manufactured. To compensate for this variation, each nozzle in an array is tested and the velocity adjustment is made by either increasing or decreasing the driving pulse voltage to the transducer. While these adjustments can be readily made during manufacturing and assembly, because almost every transducer requires a different level voltage pulse, the cost of the power supply and associated control electronics is substantially increased. Furthermore, if a print head has to be replaced in the field, for whatever the reason, the electronics associated with the print head also have to be replaced. Thus, the cost of a replacement print head is high and typically requires services of a qualified technician.

DISCLOSURE OF THE INVENTION

In accordance with the present invention, we provide a method for adjusting the velocity of ink droplets generated by each individual nozzle in a nozzle array such that the driving pulse to each of the nozzles is of the same magnitude, by adjusting the piezoelectric effect of each transducer associated with its respective nozzle.

THE DRAWING

FIG. 3 is a sectional view taken along the line 3—3 of FIG. 2 illustrating a first operating condition of a component of the print head assembly of FIG. 1;

FIG. 4 is a sectional view similar to that of FIG. 3 illustrating a second operating condition of a component of the print head assembly of FIG. 1; and FIG. 5 is an enlarged sectional view of certain of the components of the print head assembly of FIG. 3.

DETAILED DESCRIPTION

Figure 1:
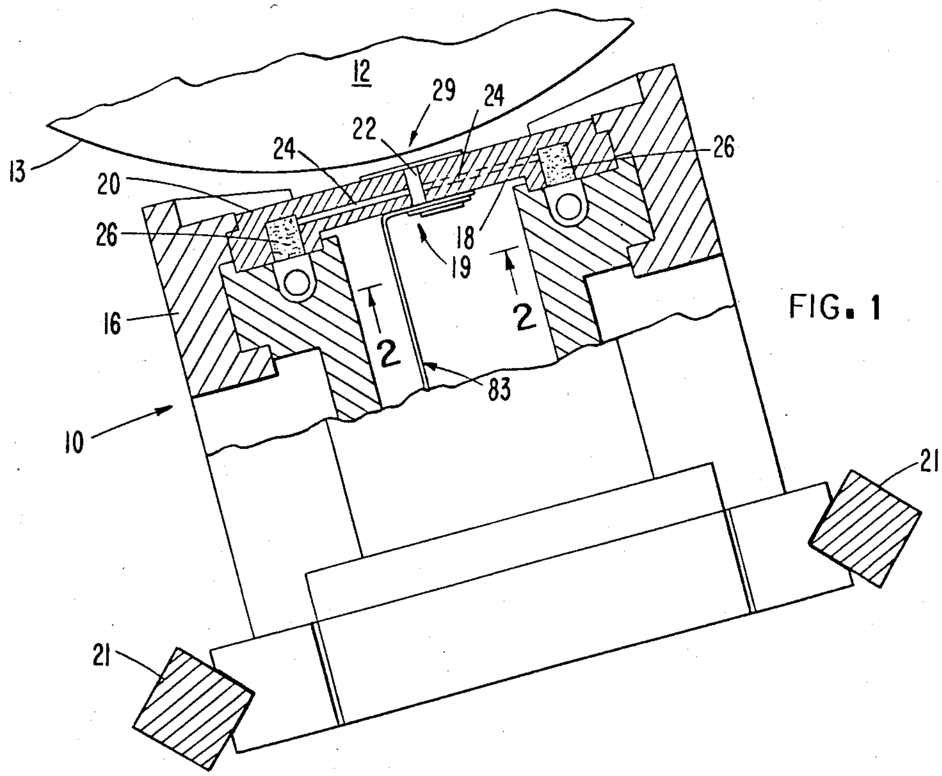
FIG. 1 is a partial sectional view of a portion of an ink jet printer including a print head assembly embodying certain features of this invention.

An ink jet printer 10, illustrated in FIG. 1, includes a drum 12 supporting and transporting a recording medium 13. The printer 10 also includes a frame 16 carrying a print head assembly 18 including a plurality of ink jets 19. The frame 16 is supported by a pair of guide rails 21 for movement along a predetermined path. The print head assembly 18 includes a cavity block 20 having a plurality of open ended cylindrical chambers 22 in communication through passage 24 with ink supply reservoirs 26. The chambers 22 are arranged in a linear array with the axis of each chamber 22 normal to the surfaces of the cavity block 20.

One of the ink jets 19 is illustrated in FIGS. 3, 4 and 5. As shown, the end of the chamber 22 disposed toward the drum 12 is covered with a nozzle 29 including a nozzle plate 25 having a tapered passage 27 terminating in a nozzle orifice 28. The nozzle plate 25 is secured to the cavity block by an adhesive 30. A polysulfide rubber compound has been found to be a suitable adhesive. The exposed surface of the nozzle plate 25 is covered with a layer of anti-wetting film 32 which prevents the ink droplets from wetting the surface of the nozzle plate 25 thus assuring movement of the droplets toward the print medium 13 after passing through the nozzle orifice 28.

The opposite end of the chamber 22 is covered with an actuator 50 which has a layered construction. The first layer of the actuator 50 is a single, thin sheet of insulating material 52. A suitable insulating material is a polyimide material sold under the trademark KAPTON by E. I. DuPont DeNemours and Company. Other suitable materials include a wide range of polymers such as polysulfone, polyethylene, polypropylene, polyester, and polytetrafluoroethylene. KAPTON is particularly suitable due to its ability to efficiently transmit movement to the ink 54 without generating excessive reflected waves. The acoustic impedance characteristics of KAPTON are quite similar to the acoustic impedance characteristics of liquid ink thus providing efficient energy transfer between the two media. A bending plate 56 is bonded with an adhesive layer 58 to the surface of the sheet of insulating material 52 and is positioned over the opening in the chamber 22. One material among many which are suitable for the bending plate 56 is nickel. Nickel provides desired stiffness, conductivity, and solderability. Connected to the bending plate 56, continuing over the surface of the insulated sheet 52 and secured thereto by the adhesive layer 58, is a ribbon conductor 59, which is also connected to a printer control circuit (not shown). The bending plate 56 and ribbon conductor 59 may be integral, that is, both may be formed of the same material.

The actuator 50 additionally includes a plate 60 of piezoelectric ceramic material such as PTS 1278 manufactured by Piezo Electric Products Inc. The surfaces of the piezoelectric ceramic plate 60 are coated with a thin metallic film providing two opposing electrodes 62, 64. Electroless nickel has been found to be a satisfactory material for the electrodes. The first electrode 62 is secured with solder 66 to the bending plate 56. Conductive epoxy has also been found suitable.

Figure 2:
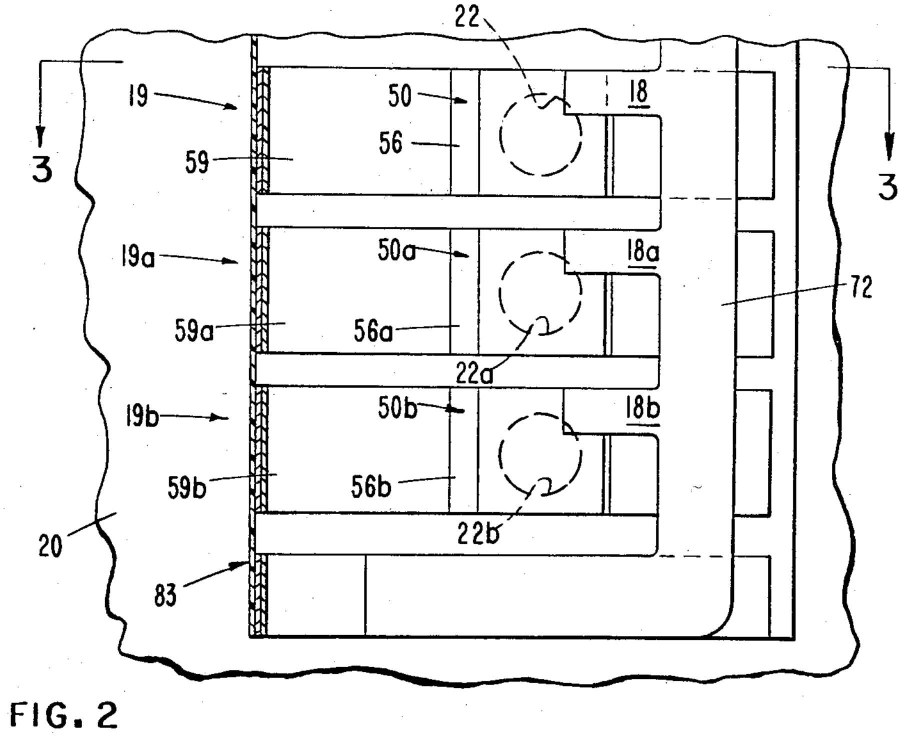
FIG. 2 is a plan view of the portion of the print head assembly taken along the line 2—2 of FIG. 1.

The print head assembly 18 also includes a second conductor 72 having a plurality of fingers 81, 81*a*, and 81*b*. One of the fingers 81 is bonded by solder 80 to the second electrode 64 of the actuator 50. The conductor 72 is positioned to allow connection of each actuator 50, 50*a*, and 50*b* to its respective fingers 81, 81*a*, and 81*b* as shown in FIG. 2. The opposite end of the conductor 72 is connected to the previously mentioned control unit (not shown). An insulating spacer 70 is positioned to prevent shorting of the conductor 72 with the solder layer 66. The spacer is bonded to the solder layer 66 by a layer of adhesive 73. The end of the conductor 72 is attached to the spacer 70 by an adhesive fillet 74, and the combination forms a flat cable 83 which may be conveniently routed within the printer 10.

The cable 83 and the actuators 50, 50*a*, and 50*b* are preferably fabricated as a complete unit. Thereafter, the actuators 50, 50*a*, and 50*b* are aligned to their respective chambers 22, 22*a*, and 22*b*. The exposed surface of the flexible insulating sheet 52 is bonded to the surface of the cavity block 20 by adhesive 82. In practice, the surface of the cavity block 20 is covered with a thin layer of adhesive and the insulating sheet 52 subsequently positioned. This procedure assures that the actuators 50, 50*a*, and 50*b* are accurately positioned and that the bending and piezoceramic plates associated with each of the actuators are protected from the corrosive action of the ink 54.

The rest position of the actuator 50 is shown in FIG. 3. The surface tension of the ink 54, at the nozzle orifice 28, is sufficient to keep the ink 54 within the chamber 22. In response to the application of an electrical potential across the electrodes 62, 64, an electric field is produced in the piezo ceramic plate 60 causing a slight increase in its thickness and a reduction in the surface area of the plate 60. The bending plate 56, bonded to the piezo ceramic plate 60, resists dimensional changes in the surface area of the piezo ceramic plate 60. Thus, when the piezo ceramic plate contracts, the actuator 50 bulges into the chamber 22 (FIG. 4). The pressure and volumetric displacement generated by the actuator 50, in the chamber 22, forces ink droplets 84 out of the nozzle orifice 28 toward the recording medium 13.

The family of piezo ceramic materials, of which one was used in the construction of the plate 60, are polycrystalline in nature and do not have piezoelectric properties in their original state. Piezoelectric behavior is induced in these materials by a polarizing treatment commonly known as "poling".

In the piezoelectric materials, the directions of the electrical and mechanical axes depend upon the direction of the original d.c. polarizing field. During the poling process a ceramic element experiences an increase in dimension between poling electrodes and a decrease in dimension parallel to the electrodes. After the poling process is finished a slight change in dimension persists.

When a d.c. voltage of the same polarity as the poling voltage is subsequently applied between the poling electrodes, the element again experiences an expansion in the poling direction and contraction parallel to the electrodes. When the voltage is removed from the electrodes, the element returns to the original poled dimensions.

In order to explain the theory behind the velocity adjustment, it is necessary to have a basic understanding of piezo ceramics. Below the Curie temperature, the dipole crystallites in the ceramic are aligned in certain allowed domains such that overall the dipoles cancel each other out. In order for the ceramic to exhibit the piezoelectric effect the ceramic must have an overall dipole moment. Poling subjects the ceramic to an electric field of sufficient magnitude to give the ceramic such an overall dipole moment.

In a typical unpoled ceramic, $\frac{1}{3}$ of the crystal dipoles are aligned in the allowed directions nearest to the poling axis. Of that $\frac{1}{3}$, half are in alignment with the poling field, the other half 180 deg. out of alignment. The other $\frac{2}{3}$ of the crystal dipoles are aligned in the allowed orientations approximately 90 deg. to the poling axis. When a voltage of sufficient magnitude (500 to 1000 volts/mm) is applied, the crystal dipoles that are 180 deg. out of alignment switch by 180 deg. and into alignment with the poling field. The crystal dipoles that are 90 deg. out of alignment switch to the allowed positions closest to alignment with the field. When the poling voltage is withdrawn, all of the dipoles that were 180 deg. out of alignment remain in the allowed positions in alignment with the field and a portion of the dipoles that were 90 deg. out of alignment remain in allowed positions closest to alignment with the poling field. The switching of these dipoles to a position in alignment with the poling field and the remnant polarization is the phenomenon known as polarization. The degree of polarization is dependent on the purity of the ceramic and the strength and the time of application of the field.

When a voltage is applied across the poled ceramic, the dipoles are stretched or compressed depending on the polarity of the voltage. This causes a strain that results in a dimensional change in the ceramic. The magnitude of the dimensional change is directly influenced by how well the dipoles are aligned and the strength of the electric field. Ink drops are ejected by harnessing this physical deformation of the piezo ceramic in an actuator.

The velocity of ink drops generated by each actuator is varied by adjusting the magnitude of dimensional change e.g. piezoelectric effect of each actuator in response to a standard drive signal. This is accomplished by partial depolarization of the piezo ceramic actuators.

The piezo ceramic is depoled by applying a sufficiently high voltage field to the ceramic in the opposite direction of the previously applied poling voltage. The degree of the alignment of the dipoles in a piezo ceramic actuator may be measured by measuring the capacitance of the actuator. The higher the capacitance of the actuator, the higher the degree of dipole alignment. The typical capacitance of a piezo actuator before poling is approximately 1.2 nf. The capacitance of a fully poled piezo ceramic actuator is approximately 2.1 nf.

Fully poled piezo actuators having piezo ceramic plate of approximately 2.5 mils were subjected to a series of 15 millisecond voltage pulses varying from 50 to 100 volts. The pulses were opposite in polarity to the original poling voltage. Each application of a 50 volt pulse reduced the capacitance of a piezo actuator by a small amount indicating that the piezo actuator was being depoled. When 60 volt pulses were applied to a fully poled actuator the capacitance of the actuator decreased, then started to increase indicating that the actuator was being poled. Thus, 60 volt field applied to the piezo actuator opposite to the direction of the original poling field was of sufficient magnitude to repole the piezo (begin to align the dipoles) in the opposite direction. Each successive pulse realigned more of the dipoles. Higher voltage pulses resulted in greater repoling. Thus, the degree of piezo ceramic poling is controlled by adjusting the number, magnitude, and polarity, of voltage pulses applied to the piezo actuator.

Straight forward application of this method in the adjustment of an actuator is to pulse the actuator with an opposite polarity 50 volt field (−50 volts) until the actuator is depoled to a predetermined level at which the actuator will generate ink droplets having an acceptable velocity. The problem with this approach is that the desired operating voltage, about 35 volts, is sufficient to realign the weakly held dipoles into the poled direction thereby increasing the degree of dipole alignment. Even though the operating signal pulse is very short (18 usec), it realigns the weakly held dipoles over a long period of time making lasting accurate adjustment impossible.

To keep these weakly held dipoles from being realigned by the operating voltage, during the adjustment process the piezo actuator has to be depoled in the direction opposite to the operating direction and then repoled by a voltage substantially greater than the operating voltage, but much less than the original poling voltage, a step at a time, in the operating direction to the desired level. During this operation, the weakly held dipoles wind up being aligned in the direction of the operating field. The limit as to how much the activity of the piezo ceramic can be reduced is determined by the operating voltage field. If the piezo is depoled to a point such that the weakly held dipoles are controlling the adjustment, the operating voltage will align all the weakly held dipoles and raise the activity of the piezo and therefore the velocity of the ink droplets.

Figure 6:
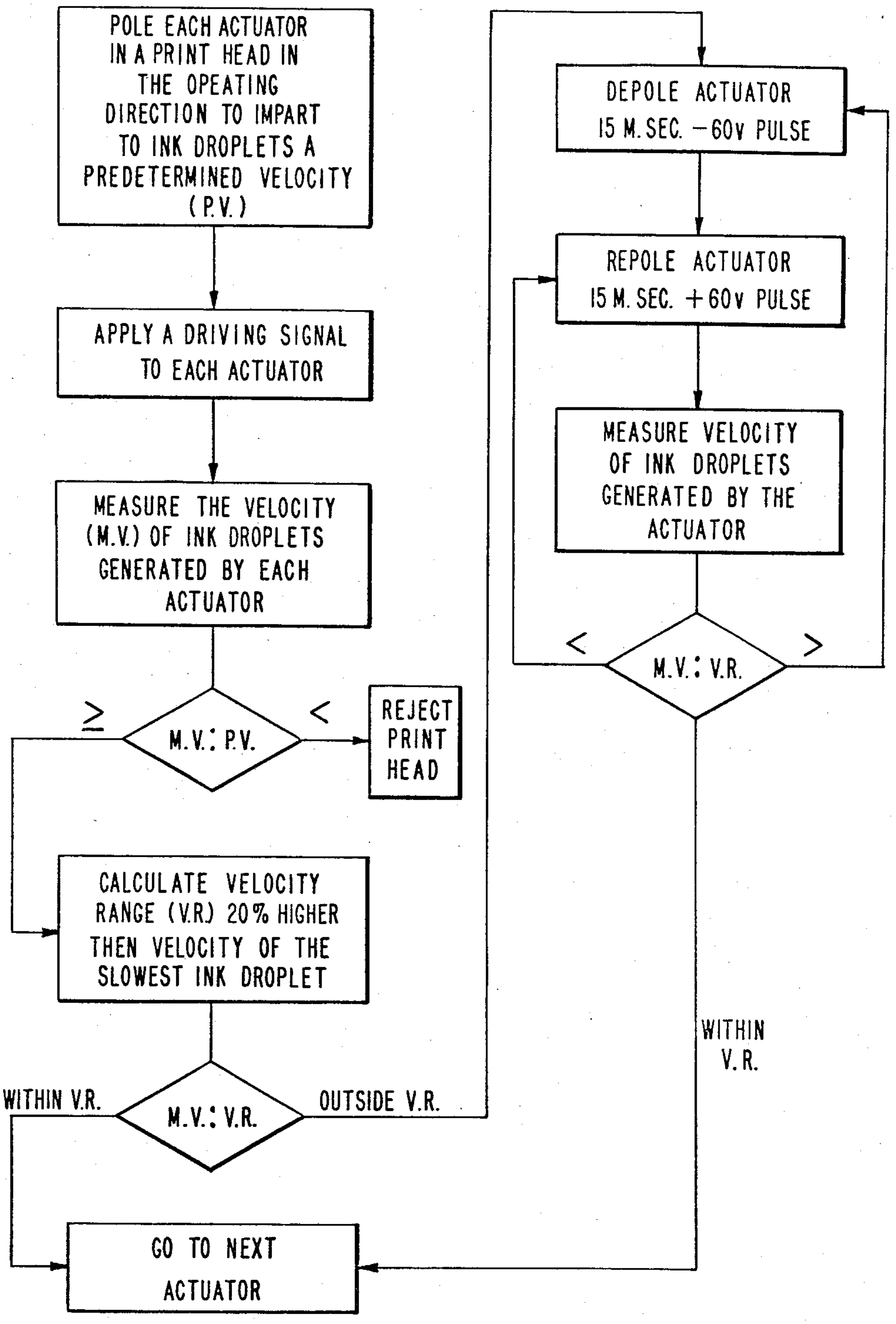
FIG. 6 is a flow chart illustrating the method for adjusting velocities of individual ink jet nozzles in a nozzle array.

The process to adjust the actuators in a print head is shown in the flow chart of FIG. 6. All the actuators in the print head are initially poled in the operating direction, such that a predetermined driving voltage level (35 volts) applied to an actuator will impart the minimum acceptable velocity (2.5 meters/sec) to an ink droplet. The velocities of all the ink droplets of the print head are then measured using a Laser Doppler Velocimeter. Apparatus and method are described in an article entitled "Laser Doppler Velocimetering and Fiber Optics," by Dr. R. K. Menon, published in Sensors, December 1955 issue. If the lowest measured velocity is below the minimum acceptable velocity, the print head is rejected; if not, a velocity band 20% greater than the lowest measured velocity is calculated. All nozzles having ink drop velocities greater than the upper limit of the band have to be adjusted. A piezo actuator of such a nozzle is depoled using a 15 msec. 60 volt field (−60 volt) opposite to the direction of the original poling. This field poles the piezo ceramic in the direction opposite to the operating direction. A 15 msec. pulse of 60 volts applied in the same direction (+60 volt) as the operating field is then applied to repole orientation of the piezo ceramic. Due to hysteresis (analogous to magnetic material subjected to changing magnetizing force), the 60 volt pulses do not have a reciprocal effect. The velocity of the ink droplets is then measured again, and if it is still high, the −60, +60 voltage pulses are repeated; if the velocity is low, then additional +60 volt pulses are administered until the desired velocity is reached. This procedure is repeated on each of the nozzles which need adjustment.

The adjustment procedure lends itself to automation. The velocities read on a Laser Doppler Velocimeter may be fed to a computer which determines which actuators need adjustment and then controls the adjustment procedure.

What is claimed is:

1. A method of adjusting the velocity of ink droplets generated by each one of a plurality of piezo ceramic actuators of an ink jet print head, comprising the steps of:

poling each actuator of said print head to induce a piezoelectric effect in each, applying a driving signal of the same magnitude to each of said actuators to generate ink droplets, and adjusting the piezoelectric effect level of each of said actuators generating ink droplets having velocities outside a predetermined velocity range.

2. The method as defined in claim 1 wherein said poling step includes applying a d.c. potential of a predetermined polarity and magnitude across each actuator.

3. The method as defined in claim 1 wherein said adjusting step includes the steps of: depoling a selected actuator, and repoling said actuator.

4. The method as defined in claim 3 wherein said step of depoling includes applying a d.c. voltage pulse of a predetermined duration, magnitude and polarity across said actuator.

5. The method as defined in claim 4 wherein the polarity of said depoling pulse is opposite to the polarity of the poling potential.

6. The method as defined in claim 3 wherein said repoling step includes applying a d.c. voltage pulse of opposite polarity to the depoling pulse.

7. The method as defined in claim 6 wherein the magnitude of said depoling and repoling pulses is greater, than the magnitude of said driving pulse.

8. The method as defined in claim 1 further including che steps of:

measuring the velocity of ink droplets generated by each of said actuators, comparing the velocity of ink droplets generated by each actuator to a predetermined minimum velocity, rejecting said print head if any of said actuators have velocity below the predetermined minimum velocity, calculating a velocity range if the velocity of ink droplets generated by all actuators in the print head exceed the minimum predetermined velocity.

9. The method as defined in claim 8 wherein said step of calculating a velocity range includes the steps of:

determining the lowest velocity of ink droplets above the predetermined minimum velocity, defining said lowest velocity as the lower limit of the velocity range, and defining the velocity of ink droplets 20% greater than said lowest velocity as the upper limit of the velocity range.

* * * * *